(12) United States Patent
Jin et al.

(10) Patent No.: US 11,914,968 B2
(45) Date of Patent: Feb. 27, 2024

(54) OFFICIAL DOCUMENT PROCESSING METHOD, DEVICE, COMPUTER EQUIPMENT AND STORAGE MEDIUM

(71) Applicant: PING AN TECHNOLOGY (SHENZHEN) CO., LTD., Guangdong (CN)

(72) Inventors: Xiaohui Jin, Guangdong (CN); Xiaowen Ruan, Guangdong (CN); Liang Xu, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 298 days.

(21) Appl. No.: 17/620,817

(22) PCT Filed: Dec. 11, 2020

(86) PCT No.: PCT/CN2020/135718
§ 371 (c)(1),
(2) Date: Dec. 20, 2021

(87) PCT Pub. No.: WO2021/121158
PCT Pub. Date: Jun. 24, 2021

(65) Prior Publication Data
US 2022/0414345 A1    Dec. 29, 2022

(30) Foreign Application Priority Data

Jun. 10, 2020 (CN) .......................... 202010523793.0

(51) Int. Cl.
*G06F 40/40* (2020.01)
*G06F 40/103* (2020.01)
(Continued)

(52) U.S. Cl.
CPC ............ *G06F 40/40* (2020.01); *G06F 40/103* (2020.01); *G06V 30/412* (2022.01); *G06V 30/418* (2022.01)

(58) Field of Classification Search
CPC ..... G06F 40/40; G06F 40/103; G06V 30/412; G06V 30/418
See application file for complete search history.

(56) References Cited

U.S. PATENT DOCUMENTS

2015/0169995 A1* 6/2015 Panferov ............. G06V 30/414
382/220
2021/0124919 A1* 4/2021 Balakrishnan ....... B42D 25/309

* cited by examiner

*Primary Examiner* — Douglas Godbold
*Assistant Examiner* — Darioush Agahi

(57) ABSTRACT

The application belongs to the field of big data, and particularly relates to an official document processing method, device, computer equipment and storage medium. The method includes the following steps of: performing format analysis on the to-be-reviewed official document, then acquiring the to-be-reviewed official document of standard file type, and identifying all file components and contents in the to-be-reviewed official document of standard file type; performing text format detection, text content detection and frame layout detection synchronously by a preset text processing model, obtaining a format detection result, a content detection result and a layout detection result; generating a detected error content according to the format detection result, content detection result and layout detection result, calling out a standard writing rule corresponding to the detected error content, marking the detected error content and the standard writing rule in the to-be-reviewed official document.

19 Claims, 2 Drawing Sheets

(51) Int. Cl.
*G06V 30/418* (2022.01)
*G06V 30/412* (2022.01)

Client         Server

Fig. 1

Receiving a review request containing a to-be-reviewed official document sent by a user, performing format analysis on the to-be-reviewed official document and acquiring file type of the to-be-reviewed official document, then acquiring the to-be-reviewed official document of standard file type, and identifying all file component contents in the to-be-reviewed official document of standard file type by a preset BERT model. — S10

Performing text format detection, text content detection and frame layout detection synchronously by a preset text processing model constructed based on a distributed framework, obtaining a format detection result, a content detection result and a layout detection result; the text format detection comprises following steps of: calling a format detection rule corresponding to each file component content, extracting a text format keyword in the file component content, and obtaining a format detection result according to the text format keyword and a format bar in the format detection rule corresponding to the text format keyword; the text content detection comprises step of obtaining a content detection result after performing text content detection on the file component content; the frame layout detection comprises following steps of: dividing coordinate information of the to-be-reviewed official document of standard file type, and performing frame layout detection on the to-be-reviewed official document according to the coordinate information that is divided to obtain a layout detection result. — S20

Generating a detected error content according to the format detection result, content detection result and layout detection result, calling out a standard writing rule corresponding to the detected error content, marking the detected error content and the standard writing rule at a preset position in the to-be-reviewed official document, and sending the to-be-reviewed official document that is successfully marked to a preset receiving location according to a storage path designated by the user. — S30

OFFICIAL DOCUMENT PROCESSING METHOD, DEVICE, COMPUTER EQUIPMENT AND STORAGE MEDIUM

The present application claims the benefit of Chinese patent application filed with China Patent Office on Jun. 10, 2020, with the application number of 202010523793.0 and the title of "Official document processing method, device, computer equipment and storage medium", the contents of which are incorporated herein by reference in their entirety.

TECHNICAL FIELD

The application relates to the field of data analysis of big data, and particularly relates to an official document processing method, device, computer equipment and storage medium.

BACKGROUND

Before issuing official documents, it is necessary to review the standardization of official documents. In the prior art, it is required to manually review the written format according to requirements of official documents in detail. In the process of manual review of official documents, reviewers need to be extremely familiar with all the standardization and the specifics of the 15 types of official documents in the Regulations on Official Document Processing of Party and Government Offices. However, at present, there is a large number of official documents from various organs and departments, and the inventor realized that it is time-consuming and labor-intensive to manually review different official documents word by word, and it is likely to have the problem of missing certain review requirements. Therefore, there is an urgent need for a method that can automatically and accurately review official documents to solve the above problems.

SUMMARY

Based on this, it is necessary to provide an official document processing method, device, computer equipment and storage medium, aiming at the above technical problems, which can be used to automatically review official documents, so as to improve the review efficiency and accuracy of official documents.

An official document processing method, including:
  receiving a review request containing a to-be-reviewed official document sent by a user, performing format analysis on the to-be-reviewed official document and acquiring file type of the to-be-reviewed official document, then acquiring the to-be-reviewed official document of standard file type, and identifying all file component contents in the to-be-reviewed official document of standard file type by a preset BERT model;
  performing text format detection, text content detection and frame layout detection synchronously by a preset text processing model constructed based on a distributed framework, obtaining a format detection result, a content detection result and a layout detection result; the text format detection includes following steps of: calling a format detection rule corresponding to each file component content, extracting a text format keyword in the file component content, and obtaining a format detection result according to the text format keyword and a format bar in the format detection rule corresponding to the text format keyword; the text content detection includes step of obtaining a content detection result after performing text content detection on the file component content; the frame layout detection includes following steps of: dividing coordinate information of the to-be-reviewed official document of standard file type, and performing frame layout detection on the to-be-reviewed official document according to the coordinate information that is divided to obtain a layout detection result; and
  generating a detected error content according to the format detection result, content detection result and layout detection result, calling out a standard writing rule corresponding to the detected error content, marking the detected error content and the standard writing rule at a preset position in the to-be-reviewed official document, and sending the to-be-reviewed official document that is successfully marked to a preset receiving location according to a storage path designated by the user.

An official document processing device, including:
  an identification module, configured to receive a review request containing a to-be-reviewed official document sent by a user, perform format analysis on the to-be-reviewed official document and acquire file type of the to-be-reviewed official document, then acquire the to-be-reviewed official document of standard file type, and identify all file component contents in the to-be-reviewed official document of standard file type by a preset BERT model;
  an acquisition module, configured to perform text format detection, text content detection and frame layout detection synchronously by a preset text processing model constructed based on a distributed framework, obtain a format detection result, a content detection result and a layout detection result; the text format detection includes following steps of: calling a format detection rule corresponding to each file component content, extracting a text format keyword in the file component content, and obtaining a format detection result according to the text format keyword and a format bar in the format detection rule corresponding to the text format keyword; the text content detection includes step of obtaining a content detection result after performing text content detection on the file component content; the frame layout detection includes following steps of: dividing coordinate information of the to-be-reviewed official document of standard file type, and performing frame layout detection on the to-be-reviewed official document according to the coordinate information that is divided to obtain a layout detection result; and
  a sending module, configured to generate a detected error content according to the format detection result, content detection result and layout detection result, call out a standard writing rule corresponding to the detected error content, mark the detected error content and the standard writing rule at a preset position in the to-be-reviewed official document, and send the to-be-reviewed official document that is successfully marked to a preset receiving location according to a storage path designated by the user.

A computer equipment, including a memory, a processor, and computer readable instructions stored in the memory and executable on the processor, wherein the processor executes the computer readable instructions to implement following steps:

receiving a review request containing a to-be-reviewed official document sent by a user, performing format analysis on the to-be-reviewed official document and acquiring file type of the to-be-reviewed official document, then acquiring the to-be-reviewed official document of standard file type, and identifying all file component contents in the to-be-reviewed official document of standard file type by a preset BERT model;

performing text format detection, text content detection and frame layout detection synchronously by a preset text processing model constructed based on a distributed framework, obtaining a format detection result, a content detection result and a layout detection result; the text format detection includes following steps of: calling a format detection rule corresponding to each file component content, extracting a text format keyword in the file component content, and obtaining a format detection result according to the text format keyword and a format bar in the format detection rule corresponding to the text format keyword; the text content detection includes step of obtaining a content detection result after performing text content detection on the file component content; the frame layout detection includes following steps of: dividing coordinate information of the to-be-reviewed official document of standard file type, and performing frame layout detection on the to-be-reviewed official document according to the coordinate information that is divided to obtain a layout detection result; and generating a detected error content according to the format detection result, content detection result and layout detection result, calling out a standard writing rule corresponding to the detected error content, marking the detected error content and the standard writing rule at a preset position in the to-be-reviewed official document, and sending the to-be-reviewed official document that is successfully marked to a preset receiving location according to a storage path designated by the user.

One or more readable storage mediums, storing computer readable instructions, wherein the computer readable instructions, when executed by one or more processors, cause the one or more processors to implement following steps:

receiving a review request containing a to-be-reviewed official document sent by a user, performing format analysis on the to-be-reviewed official document and acquiring file type of the to-be-reviewed official document, then acquiring the to-be-reviewed official document of standard file type, and identifying all file component contents in the to-be-reviewed official document of standard file type by a preset BERT model;

performing text format detection, text content detection and frame layout detection synchronously by a preset text processing model constructed based on a distributed framework, obtaining a format detection result, a content detection result and a layout detection result; the text format detection includes following steps of: calling a format detection rule corresponding to each file component content, extracting a text format keyword in the file component content, and obtaining a format detection result according to the text format keyword and a format bar in the format detection rule corresponding to the text format keyword; the text content detection includes step of obtaining a content detection result after performing text content detection on the file component content; the frame layout detection includes following steps of: dividing coordinate information of the to-be-reviewed official document of standard file type, and performing frame layout detection on the to-be-reviewed official document according to the coordinate information that is divided to obtain a layout detection result; and generating a detected error content according to the format detection result, content detection result and layout detection result, calling out a standard writing rule corresponding to the detected error content, marking the detected error content and the standard writing rule at a preset position in the to-be-reviewed official document, and sending the to-be-reviewed official document that is successfully marked to a preset receiving location according to a storage path designated by the user.

The above official document processing method, device, computer equipment and storage medium can simultaneously realize the review of a document for various standardization requirements (including the review processing of the text format, text content and frame layout of the document to be reviewed) through the preset text processing model constructed by distributed framework. In this way, not only does it not need manpower, but it can quickly and accurately complete the review of a document, ensuring that the standardization requirements of document review are not missed, thus improving the efficiency and accuracy of document review. And the review of each standardization requirement exists independently and does not influence others. In addition, the detected error contents and standard writing rules are marked at the preset positions in the to-be-reviewed official document, so that users can directly modify the to-be-reviewed official document according to the marked contents.

Details of one or more embodiments of the present application are shown in the following drawings and description, and other features and advantages of the application will become apparent from the specification, drawings and claims.

BRIEF DESCRIPTION OF DRAWINGS

In order to explain the technical solution of the embodiments of the present application more clearly, the drawings used in the description of the embodiments of the application will be briefly introduced below. Obviously, the drawings in the following description show only some embodiments of the application, and for those of ordinary skill in the field, other drawings may be obtained according to these drawings without any creative effort.

DETAILED DESCRIPTION

The technical solution in the embodiments of the present application will be described clearly and completely with reference to the drawings in the embodiments of the application. Obviously, the described embodiments are part of the embodiments of the application, not all of them. Based on the embodiments in the present application, all other embodiments obtained by those skilled in the art without creative effort fall in the protection scope of the application.

Figure 1:
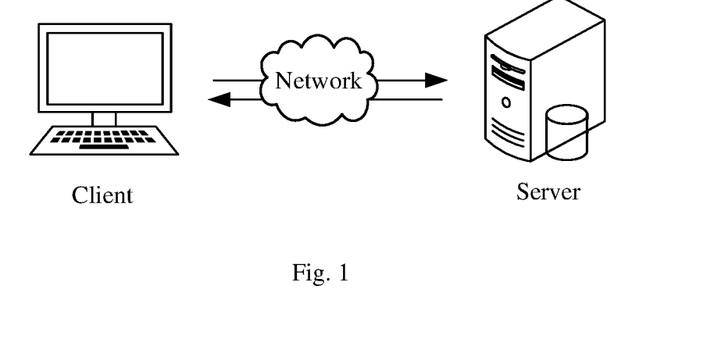
FIG. 1 is a schematic diagram of an application environment of an official document processing method according to an embodiment of the present application.

The official document processing method provided by the present application can be applied in the application environment as shown in FIG. 1, in which the client communicates with the server through network. Wherein, the client may be but not limited to various personal computers, notebook computers, smart phones, tablet computers and portable wearable devices. The server may be an independent server or a server cluster composed of multiple servers.

Figure 2:
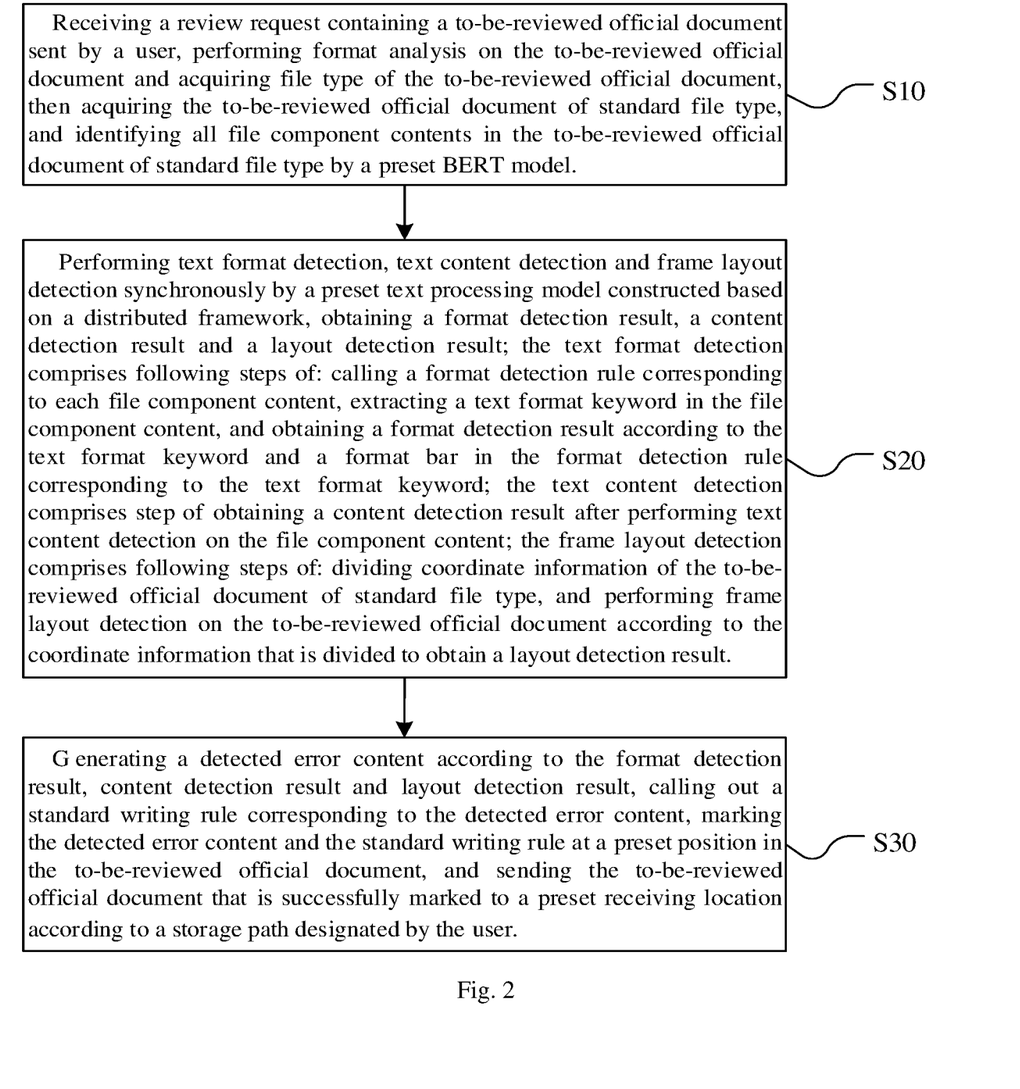
FIG. 2 is a flow diagram of an official document processing method according to an embodiment of the present application.

In an embodiment, as shown in FIG. 2, an official document processing method is provided, which is illustrated by taking the application of the method to the server shown in FIG. 1 as an example, and includes the following steps:

S10: receiving a review request containing a to-be-reviewed official document sent by a user, performing format analysis on the to-be-reviewed official document and acquiring file type of the to-be-reviewed official document, then acquiring the to-be-reviewed official document of standard file type, and identifying all file component contents in the to-be-reviewed official document of standard file type by a preset BERT model.

It can be understood that the to-be-reviewed official documents may all kinds of official documents from organs or institutions to be examined whether they are standardized or not, wherein each kind of the to-be-reviewed official document at least meets more than one standardization requirement of standard official documents. The standardization requirement may include but not limited to file format, file content, file text format and file layout, etc. Specifically, users can send a review request by the display device after selecting a review requirement for the to-be-reviewed official document. And the review requirement is to examine all the standardization requirements for the to-be-reviewed official document. Identifying the to-be-reviewed official document of standard file type is a process of converting structured text data (to-be-reviewed official document) into meaningful text data and performing text parsing. After the process is finished, the file component contents of various structural components can be obtained. In which, various parsing techniques such as language, statistics and machine learning models may be used in the identification process. In this embodiment, all the file component contents are mainly analyzed, mined and identified from the to-be-reviewed official document. And the file component contents mentioned in this embodiment include document number, document title, document receiver, document body, document signature, document attachments and document annotation, etc. The preset BERT model is a language representation model that can be used to analyze the file component contents of the to-be-reviewed official document. The specific training process of the BERT model is as follows: firstly, the file component contents in the to-be-reviewed official need to be marked, then the BERT model is modeled. And, before training the BERT model, the existing word vectors in the BERT model can be enhanced according to the successfully marked file component contents in the to-be-reviewed official document, so that the distribution of word vector representation is more suitable for the to-be-reviewed official document. In the training process, the BERT model may be continuously adjusted slightly through BERT-base to make the word vector distribution more appropriate. Finally, after finish the training of all word vectors, classification results (one category represents one file component content) of the file component contents of the to-be-reviewed official document can be obtained from the output position of the BERT model. The output form of the classification results is the probabilities corresponding to different file component contents in the to-be-reviewed official document. By comparing each probability in the classification results with a preset threshold, the file component content corresponding to the classification result can be determined. In this embodiment, an interface is provided on the server to specially receive the to-be-reviewed official document uploaded by user when sending the review request. However, the to-be-reviewed official document uploaded by user may be of various file types, including but not limited to docx, doc or pdf, etc. Therefore, to identify the to-be-reviewed official document uniformly and quickly, the file type of the to-be-reviewed official document can be converted into a required standard file type by a file type conversion module in the server, and the standard file type may be any one of docx, doc or pdf. In this embodiment, the file component contents of various structures may also be identified and confirmed from the structured to-be-reviewed official document through the preset BERT model, thereby facilitating the subsequent data processing on one or more of the file component contents.

S20: performing text format detection, text content detection and frame layout detection synchronously by a preset text processing model constructed based on a distributed framework, obtaining a format detection result, a content detection result and a layout detection result; the text format detection includes following steps of: calling a format detection rule corresponding to each file component content, extracting a text format keyword in the file component content, and obtaining a format detection result according to the text format keyword and a format bar in the format detection rule corresponding to the text format keyword; the text content detection includes step of obtaining a content detection result after performing text content detection on the file component content; the frame layout detection includes following steps of: dividing coordinate information of the to-be-reviewed official document of standard file type, and performing frame layout detection on the to-be-reviewed official document according to the coordinate information that is divided to obtain a layout detection result.

It can be understood that the format detection result is accomplish by the rule engine, wherein the specific implementations of the rule engine are mainly the process of receiving data input, interpreting preset rules and making rule decisions according to a preset rule. Specifically, in this embodiment, file format detection is carried out on the file component contents of the to-be-reviewed official document through a format detection rule, and mainly in the running process of the rule engine, the corresponding format detection rule is executed for each file component content using keyword retrieval technology. It can be seen that the format detection rules corresponding to different component contents are inconsistent, therefore one component content shall correspond to at least one format detection rule. For example, if the to-be-reviewed official document is an official document, there would be a document number in the document, and the document number is a format bar composed of abbreviation of the document-issuing office, year and serial number. In this case, a text format keyword corresponding to the document number of the to-be-reviewed official document is extracted by the keyword retrieval technology in the rule engine. And it is determined whether the text format keyword is consistent with the format detection rule (text format keyword specified in the format bar) corresponding to the document number, so as to determine whether the file format of the document number in the file component content of the to-be-reviewed official document is correct or incorrect (the above-mentioned consistency can be used to determine that the file format of the file component content is correct, and vice versa, and other kinds of file component contents are detected in the same way). In this embodiment, the rule engine is used to detect the file format of the to-be-reviewed official document, because the rule engine can perform detection based on the preset rule without coding, which is convenient for modifying the format detection rule to adapt to the change of the format detection rule of the to-be-reviewed official document, and the rule engine could improve the detection efficiency, and the format detection result output by the rule engine and associated with various file component contents could be recorded together in the rule engine for export and use.

The content detection result is accomplished by NLP algorithm engine. NLP (Natural Language Processing) algorithm engine is a natural language processing algorithm engine, and its basic task is to determine the syntactic structure of sentences or the dependencies between words in sentences (where sentences exist in various file component contents). In this embodiment, the running tasks of NLP algorithm engine can be summarized as typo recognition, slang recognition, person name recognition and part-of-speech tagging. Specifically, the NLP algorithm engine in this embodiment detects the correctness and errors of the presentation, phrase pairs and punctuation of the document contents in the to-be-reviewed official document through the corresponding typo recognition, slang recognition, person name recognition and part-of-speech tagging models. The expression errors include, but are not limited to, typos, repetition of words, slang or cyber language, etc. For example, in "Big Data Of Health Care in Statistical Information Center Center", the repeated occurrence of the word "center" is identified as repetition of words included in the above-mentioned expression error. In "the health care data collected are dope", where "dope" is slang, it is recognized as slang included in the above-mentioned expression error. The phrase pairs error refers to the improper word collocation in the to-be-reviewed official document in a specific scene. For example, in the scene of a meeting summary, "people" in the to-be-reviewed official document shall not be directly collocated with a verb. Punctuation errors include regular punctuation errors and fixed collocation errors. For example, the subtitle "1" should be followed by "." and the use of quotation marks or plus signs such as "Technology+Finance". In this embodiment, NLP algorithm engine is adopted to detect the file content of the file component contents after text parsing, which is able to accurately obtain the content detection result based on human thought and language habits, and improve the detection efficiency.

The layout detection result is obtained by NLP algorithm engine. OCR (Optical Character Recognition) algorithm engine recognizes optical characters through image processing and pattern recognition technology. Specifically, in this embodiment, OCR algorithm engine mainly converts the to-be-reviewed official document of standard file type into a to-be-reviewed official document of the preset file type to realize the frame layout detection (where the frame layout includes text format and layout). And it takes any two sides of a page in the to-be-reviewed official document as coordinate axes, analyzes each text block in the to-be-reviewed official document to obtain coordinate information of optical characters in each text block, and determines whether the text format and layout of the to-be-reviewed official document are consistent with the requirements of the text format and layout through the coordinate information of optical characters, thereby determining whether the text format and layout are correct or incorrect. For example, the requirements of document signature and closing remarks in the to-be-reviewed official document are blank by 2 lines, and the signature is on the right. All page numbers in the to-be-reviewed official document should be set to be different from odd and even pages. The page numbers should be typed in Tahoma, font size 12. Odd page numbers should be on the right and indented by one character to the right, even page numbers should be on the left and indented by one character to the left. And horizontal lines"-" should be added to the left and right sides of the odd and even page numbers. If the text format and/or layout identified by the coordinate information of optical characters are not consistent with the above requirements, it can be determined that there is an error in the text format and/or layout of the to-be-reviewed official document, and vice versa. In this embodiment, the OCR algorithm engine is adopted to detect the frame layout of the to-be-reviewed official document, because the OCR algorithm engine has low misrecognition rate and high recognition speed for the optical characters in the to-be-reviewed official document. And it can be used to further determine the correctness and error of the text format and layout of the to-be-reviewed official document through the optical characters.

S30: generating a detected error content according to the format detection result, content detection result and layout detection result, calling out a standard writing rule corresponding to the detected error content, marking the detected error content and the standard writing rule at a preset position in the to-be-reviewed official document, and sending the to-be-reviewed official document that is successfully marked to a preset receiving location according to a storage path designated by the user.

It can be understood that the above-mentioned format detection result, content detection result and layout detection result may be obtained through a preset text processing model, wherein the preset text processing model includes a rule engine (corresponding to the format detection result), an NLP algorithm engine for file content detection (corresponding to the content detection result) and an OCR algorithm engine for frame layout detection (corresponding to the layout detection result). The above three engines are deployed in distributed frameworks. The detected error content includes all the error results detected in the format detection result, content detection result and layout detection result. In the detected error content, one error result detected corresponds to at least one standard writing rule. The preset position is the position corresponding to the detected error content and standard writing rule in the to-be-reviewed official document, i. e., the position where errors appear in the to-be-reviewed official document. In this embodiment, the purpose of marking the detected error content and the standard writing rule at a preset position in the to-be-reviewed official document is: to enable the user to clearly view the error results and causes, and to facilitate the user to modify the detected error content in the to-be-reviewed official document according to the standard writing rules.

Further, the standard writing rules are stored in the blockchain. And the step of generating a detected error content according to the format detection result, content detection result and layout detection result, calling out a standard writing rule corresponding to the detected error content, marking the detected error content and the standard writing rule at a preset position in the to-be-reviewed official document, and sending the to-be-reviewed official document that is successfully marked to a preset receiving location according to a storage path designated by the user includes:

inputting the format detection result, content detection result and layout detection result into a preset scoring model for scoring, and acquiring a scoring result of the to-be-reviewed official document output by the preset scoring model; and     generating a detected error content according to the format detection result, content detection result and layout detection result, calling out a standard writing rule corresponding to the detected error content, marking the detected error content, the scoring result and the standard writing rule at a preset position in the to-be-reviewed official document, and sending the to-be-reviewed official document that is successfully marked to a preset receiving location according to a storage path designated by the user.

It can be understood that a scoring table of different scores corresponding to various detection results have been preset in the preset scoring model, which queries the scores corresponding to the detection results from different dimension of the scoring table, and summarize the scores of all detection results (the format detection result, content detection result and layout detection result) to obtain the scoring result of the to-be-reviewed official document (the scoring result includes a total score and score of each detection result). The scoring rules may be set according to the requirements. For example, if there is a typo or punctuation error in the to-be-reviewed official document, 2 points would be deducted until all of the 10 points are deducted.

Moreover, it should be noted that in order to further ensure the privacy and security of the above-mentioned standard writing rules, the above-mentioned standard writing rules may also be stored in a blockchain node. Blockchain is a new application mode of computer technology such as distributed data storage, point-to-point transmission, consensus mechanism and encryption algorithm. Blockchain, in essence, is a decentralized database, which is a series of data blocks generated by cryptography. Each data block contains a batch of information of network transactions, which is used to verify the validity (anti-counterfeiting) of the information and generate the next block. Blockchain may include blockchain underlying platform, platform product service layer and application service layer, etc. The decentralized and completely distributed DNS service provided by blockchain can query and resolve domain names through point-to-point data transmission services among nodes in network. It can be used to ensure that the operating system and firmware of an important infrastructure are not tampered with, monitor the status and integrity of software, find out malicious tampering, and ensure that the transmitted data is not tampered with. Thus the privacy and security of standard writing rules can be ensured by storing them in the blockchain.

Further, the file component content includes a file title. And the step of calling a format detection rule corresponding to each file component content includes:

determining a document category of the to-be-reviewed official document according to a title of the to-be-reviewed official document;

if the document category falls into a preset category, calling a format detection rule corresponding to each file component content by using a rule engine; and     if the document category does not fall into the preset category, prompting that the to-be-reviewed official document is not an official document.

It can be understood that, if the document is an official document, the document category of the to-be-reviewed official document can be determined by the title in the file component content of the document. Because the writing of official documents requires that one of the 15 official documents should be reflected in the title of the document, the contents that do not belong to the 15 official documents would be determined as other documents. This embodiment is mainly to determine whether the to-be-reviewed official document belongs to the preset category, so as to further process the to-be-reviewed official document of the preset category.

Further, after the step of performing format analysis on the to-be-reviewed official document, the method further includes:

if there is no file content in the to-be-reviewed official document, prompting the user to upload the to-be-reviewed official document again and rejecting the current review request.

It can be understood that the to-be-reviewed official document in this embodiment is uploaded by users, and if there is no file content in the to-be-reviewed official document uploaded by users, there is no need to review the to-be-reviewed official document. This embodiment is mainly used to exclude those to-be-reviewed official document without file content, so as to avoid increasing the workload of the server. Whether there is file content in the to-be-reviewed official document can be determined by randomly copying any area of the to-be-reviewed official document and checking whether there is pasted content. Or it can be determined by alphanumeric recognition model.

Further, the step of calling a format detection rule corresponding to each file component content, extracting a text format keyword in the file component content, and obtaining a format detection result according to the text format keyword and a format bar in the format detection rule corresponding to the text format keyword includes:

calling a format detection rule corresponding to each file component content by using a rule engine; one format detection rule contains at least one data type and a format bar in a combination form of each data type;

extracting a text format keyword in the file component content by keyword search technology of the rule engine, and determining whether the text format keyword is consistent with the format bar in the format detection rule corresponding to the text format keyword; one file component content corresponds to at least one text format keyword;

if the text format keyword in the file component content is consistent with the format bar in the format detection rule corresponding to the text format keyword, acquiring the format detection result that file format of the file component content is correct; and     if the text format keyword in the file component content is inconsistent with the format bar in the format detection rule corresponding to the text format keyword, acquiring the format detection result that file format of the file component content is incorrect.

Specifically, a file component content corresponds to a format detection rule, the document number corresponds to the format detection rule of abbreviation of the document-issuing office+year+serial number (e.g., Ping Baofa [201X] No), and the date of document signature corresponds to the format detection rule of year+month+day (XX, XX, 201X).

Specifically, the abbreviation of the document-issuing office, year, serial number and date are all in data type. While the abbreviation of the document-issuing office+year+serial number and year+month+day are format bars in the combined form of data types. Therefore, in this embodiment, the format detection rule corresponding to each file component content is called by the rule engine (i.e., the format bar of each file component content is determined). Then, the keyword search technology of rule engine is adopted to detect whether the text format keyword in each file component content is consistent with the format bar in the corresponding format detection rule. For example, whether the numbers in the format bar of year+month+day in the date of document signature are Arabic numerals, etc. Finally, the format detection results are determined by comparing the consistency, so as to realize the detection of the correctness of file format of the to-be-reviewed official document.

Further, after acquiring file type of the to-be-reviewed official document, the method further includes:
    when it is detected that there is a table in the to-be-reviewed official document, analyzing the table, and recording each content of the table as the file component content after analysis.

It can be understood that, if the to-be-reviewed official document in this embodiment contains irregular document component contents such as tables or graphs, the contents of the tables or graphs can be analyzed, and then the tables or graphs can be converted into regular document component contents. In this way, the integrity of each document component content of the to-be-reviewed official document in the review process can be ensured.

Further, the step of dividing coordinate information of the to-be-reviewed official document of standard file type, and performing frame layout detection on the to-be-reviewed official document according to the coordinate information that is divided includes:
    converting the to-be-reviewed official document of standard file type into a preset file type to obtain a to-be-reviewed official document of the preset file type;
    inputting the to-be-reviewed official document of the preset file type into a file block division model associated with a text category of the to-be-reviewed official document by using an OCR algorithm engine, receiving a divided text block output by the file block division model, and extracting coordinate information of the divided text block; the coordinate information represents size and location of the divided text block;
    performing frame layout detection on the to-be-reviewed official document of standard file type for text format and layout according to the coordinate information.

It can be understood that, for the to-be-reviewed official document to be well recognized and detected by OCR algorithm engine, the to-be-reviewed official document of standard file type can be converted into a to-be-reviewed official document of the preset file type (such as the to-be-reviewed official document of PDF file type), thus ensuring the stability in the process of recognition and detection. The block division model is adopted to divide the to-be-reviewed official document of the preset file types into a plurality of easily recognizable text blocks. Each text block has at least one optical character, and each optical character corresponds to at least one coordinate information. And the size and location of the optical characters in the text block can also be determined by the coordinate information of the optical characters in the text block. Therefore, whether the text format and layout of the text block are consistent with the requirements of the text format and layout can be finally determined, so as to realize the detection of the text format and layout of the to-be-reviewed official document.

To sum up, the above discloses an official document processing method, which can simultaneously realize the review of a document for various standardization requirements (including the review processing of the text format, text content and frame layout of the document to be reviewed) through the preset text processing model constructed by distributed framework. In this way, not only does it not need manpower, but it can quickly and accurately complete the review of a document, ensuring that the standardization requirements of document review are not missed, thus improving the efficiency and accuracy of document review. And the review of each standardization requirement exists independently and does not influence others. In addition, the detected error contents and standard writing rules are marked at the preset positions in the to-be-reviewed official document, so that users can directly modify the to-be-reviewed official document according to the marked contents.

It should be understood that the numbers of the steps in the above embodiments do not indicate the order of implementation. The order of implementation of each step should be determined by its function and internal logic, and shall not constitute any limitation on the implementation process of the embodiments of the present application.

Figure 3:
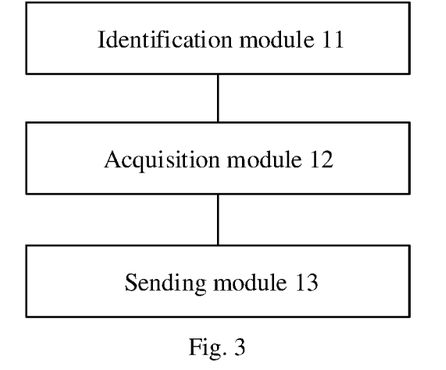
FIG. 3 is a structural schematic diagram of an official document processing device according to an embodiment of the present application.

In an embodiment, an official document processing device is provided, which corresponds to the official document processing method described in the above embodiments one by one. As shown in FIG. 3, the official document processing device includes an identification module 11, an acquisition module 12 and a sending module 13. Detailed description of each functional module is as follows:
    an identification module 11, configured to receive a review request containing a to-be-reviewed official document sent by a user, perform format analysis on the to-be-reviewed official document and acquire file type of the to-be-reviewed official document, then acquire the to-be-reviewed official document of standard file type, and identify all file component contents in the to-be-reviewed official document of standard file type by a preset BERT model;
    an acquisition module 12, configured to perform text format detection, text content detection and frame layout detection synchronously by a preset text processing model constructed based on a distributed framework, obtain a format detection result, a content detection result and a layout detection result; the text format detection includes following steps of: calling a format detection rule corresponding to each file component content, extracting a text format keyword in the file component content, and obtaining a format detection result according to the text format keyword and a format bar in the format detection rule corresponding to the text format keyword; the text content detection includes step of obtaining a content detection result after performing text content detection on the file component content; the frame layout detection includes following steps of: dividing coordinate information of the to-be-reviewed official document of standard file type, and performing frame layout detection on the to-be-reviewed official document according to the coordinate information that is divided to obtain a layout detection result; and
    a sending module 13, configured to generate a detected error content according to the format detection result, content detection result and layout detection result, call out a standard writing rule corresponding to the detected error content, mark the detected error content and the standard writing rule at a preset position in the to-be-reviewed official document, and send the to-be-reviewed official document that is successfully marked to a preset receiving location according to a storage path designated by the user.

Further, the standard writing rules are stored in the blockchain, and the sending module 13 includes:
a first acquisition submodule, configured to input the format detection result, content detection result and layout detection result into a preset scoring model for scoring, and acquire a scoring result of the to-be-reviewed official document output by the preset scoring model; and
a sending submodule, configured to generate a detected error content according to the format detection result, content detection result and layout detection result, calling out a standard writing rule corresponding to the detected error content, mark the detected error content, the scoring result and the standard writing rule at a preset position in the to-be-reviewed official document, and send the to-be-reviewed official document that is successfully marked to a preset receiving location according to a storage path designated by the user.

Further, the acquisition module 12 includes:
a first determination submodule, configured to determine a document category of the to-be-reviewed official document according to a title of the to-be-reviewed official document;
a first calling submodule, configured to, if the document category falls into a preset category, call a format detection rule corresponding to each file component content by using a rule engine; and
a prompting submodule, configured to, if the document category does not fall into the preset category, prompt that the to-be-reviewed official document is not an official document.

Further, the official document processing device further includes:
a rejecting module, configured to, if there is no file content in the to-be-reviewed official document, prompt the user to upload the to-be-reviewed official document again and reject the current review request.

Further, the acquisition module 12 includes:
a second calling submodule, configured to call a format detection rule corresponding to each file component content by using a rule engine; one format detection rule contains at least one data type and a format bar in a combination form of each data type;
a second determination submodule, configured to extract a text format keyword in the file component content by keyword search technology of the rule engine, and determine whether the text format keyword is consistent with the format bar in the format detection rule corresponding to the text format keyword; one file component content corresponds to at least one text format keyword;
a second acquisition submodule, configured to, if the text format keyword in the file component content is consistent with the format bar in the format detection rule corresponding to the text format keyword, acquire the format detection result that file format of the file component content is correct; and
a third acquisition submodule, configured to, if the text format keyword in the file component content is inconsistent with the format bar in the format detection rule corresponding to the text format keyword, acquire the format detection result that file format of the file component content is in correct.

Further, the official document processing device further includes:
a recording module i, configured to, when it is detected that there is a table in the to-be-reviewed official document, analyze the table, and record each content of the table as the file component content after analysis.

Further, the acquisition module 12 includes:
a conversion submodule, configured to convert the to-be-reviewed official document of standard file type into a preset file type to obtain a to-be-reviewed official document of the preset file type;
an extraction submodule, configured to input the to-be-reviewed official document of the preset file type into a file block division model associated with a text category of the to-be-reviewed official document by using an OCR algorithm engine, receive a divided text block output by the file block division model, and extract coordinate information of the divided text block; the coordinate information represents size and location of the divided text block;
a detection submodule, configured to perform frame layout detection on the to-be-reviewed official document of standard file type for text format and layout according to the coordinate information.

For the specific definition of the official document processing device, please refer to the above definition of the official document processing method, which will not be described in detail in the followings. All the modules in the above-described official document processing device may be realized in whole or in part by software, hardware and their combination. The above modules may be embedded in the form of hardware or independent of the processor in the computer equipment, or may be stored in the memory of the computer equipment in the form of software, so that the processor can call and execute the operations corresponding to the above modules.

Figure 4:
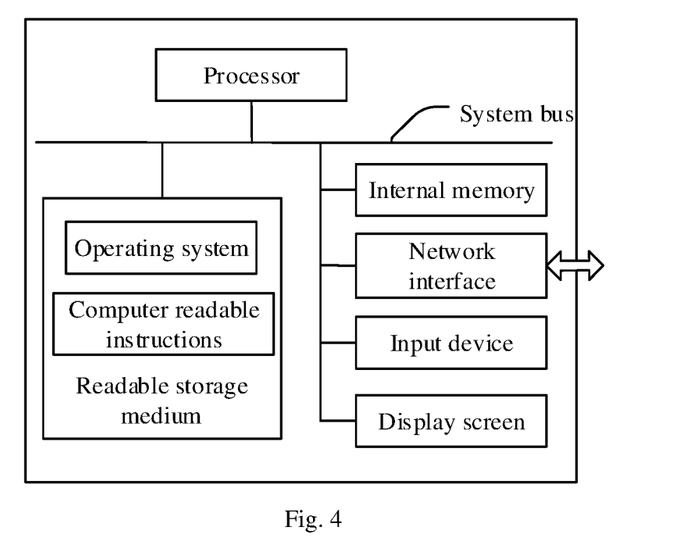
FIG. 4 is a schematic diagram of a computer equipment according to an embodiment of the present application.

In an embodiment, a computer equipment is provided, which may be a server, and its internal structure diagram is shown in FIG. 4. the computer equipment includes a processor, a memory, a network interface and a database which are connected through a system bus. Wherein the processor of the computer equipment is used for providing computing and control capabilities. The memory of the computer equipment includes a readable storage medium and an internal memory. The readable storage medium stores an operating system, computer readable instructions and a database. The internal memory provides an environment for the operation of the operating system and computer readable instructions in the readable storage medium. The database of the computer equipment is used to store the data related to the official document processing method. The network interface of the computer equipment is used to communicate with external terminals through network connection. The computer readable instructions, when executed by the processor, realize the official document processing method. The readable storage medium provided by this embodiment include nonvolatile readable storage medium and volatile readable storage medium.

In one embodiment, a computer equipment is provided, including a memory, a processor, and computer readable instructions stored in the memory and executable on the processor, wherein the processor executes the computer readable instructions, the steps of the official document processing method in the above embodiment are realized.

For example, steps S10 to S30 shown in FIG. 2. Or, when the processor executes the computer readable instructions, it realizes the functions of each module/unit of the official document processing device in the above embodiment. For example, the functions of modules 11-13 shown in FIG. 3. To avoid repetition, details would not be repeated here.

In one embodiment, one or more readable storage medium storing computer readable instructions are provided, and the readable storage medium provided in this embodiment include nonvolatile readable storage medium and volatile readable storage medium. The readable storage medium stores computer readable instructions, which, when executed by one or more processors, cause the one or more processors to implement the steps of the official document processing method in the above embodiments, such as steps S10-S30 shown in FIG. 2. Or, when the computer readable instructions are executed by one or more processors, the one or more processors can realize the functions of each module/unit of the official document processing device in the above embodiment, such as the functions of modules 11-13 shown in FIG. 3. To avoid repetition, details would not be repeated here.

A person of ordinary skill in the art can understand that all or part of the processes in the method of the foregoing embodiments can be implemented by instructing related hardware through computer readable instructions, which can be stored in a nonvolatile computer readable storage medium, and the computer readable instructions can include the steps of the above embodiments. Wherein, any reference to memory, storage, database or other medium used in the embodiments provided in this application may include nonvolatile and/or volatile memory. The nonvolatile memory may include read-only memory (ROM), programmable ROM (PROM), electrically programmable ROM (EPROM), electrically erasable programmable ROM (EEPROM), or flash memory. The volatile memory may include random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus, (Rambus) direct RAM (RDRAM), direct memory bus dynamic RAM (DRDRAM), and memory bus dynamic RAM (RDRAM), etc.

Blockchain is a new application mode of computer technology such as distributed data storage, point-to-point transmission, consensus mechanism and encryption algorithm. Blockchain, in essence, is a decentralized database, which is a series of data blocks generated by cryptography. Each data block contains a batch of information of network transactions, which is used to verify the validity (anti-counterfeiting) of the information and generate the next block. Blockchain may include blockchain underlying platform, platform product service layer and application service layer, etc.

A person of ordinary skill in the art can clearly understand that, for the convenience and conciseness of description, the division of the above functional units and modules are only used as examples. In practical applications, the above functions may be implemented by different functional units and modules as needed. That is, the internal structure of the device may be divided into different functional units or modules to complete all or part of the functions described above.

The above embodiments are only used to illustrate the technical solutions of this application, but not to limit it. Although the application has been described in detail with reference to the aforementioned embodiments, those of ordinary skill in the art should understand that the technical solutions described in the aforementioned embodiments may still be modified, or some of the technical features may be equivalently replaced. However, these modifications or substitutions do not make the essence of the technical solutions deviate from the spirit and scope of the technical solutions of each embodiment of this application, and should be included in the protection scope of this application.

The invention claimed is:

1. An official document processing method, comprising:
receiving a review request containing a to-be-reviewed official document sent by a user, performing format analysis on the to-be-reviewed official document and acquiring file type of the to-be-reviewed official document, then acquiring the to-be-reviewed official document of standard file type, and identifying all file component contents in the to-be-reviewed official document of standard file type by a preset BERT model;
performing text format detection, text content detection and frame layout detection synchronously by a preset text processing model constructed based on a distributed framework, obtaining a format detection result, a content detection result and a layout detection result; the text format detection comprises following steps of: calling a format detection rule corresponding to each file component content, extracting a text format keyword in the file component content, and obtaining a format detection result according to the text format keyword and a format bar in the format detection rule corresponding to the text format keyword; the text content detection comprises step of obtaining a content detection result after performing text content detection on the file component content; the frame layout detection comprises following steps of: dividing coordinate information of the to-be-reviewed official document of standard file type, and performing frame layout detection on the to-be-reviewed official document according to the coordinate information that is divided to obtain a layout detection result; and
generating a detected error content according to the format detection result, content detection result and layout detection result, calling out a standard writing rule corresponding to the detected error content, marking the detected error content and the standard writing rule at a preset position in the to-be-reviewed official document, and sending the to-be-reviewed official document that is successfully marked to a preset receiving location according to a storage path designated by the user.

2. The official document processing method of claim 1, wherein the step of generating a detected error content according to the format detection result, content detection result and layout detection result, calling out a standard writing rule corresponding to the detected error content, marking the detected error content and the standard writing rule at a preset position in the to-be-reviewed official document, and sending the to-be-reviewed official document that is successfully marked to a preset receiving location according to a storage path designated by the user comprises:
inputting the format detection result, content detection result and layout detection result into a preset scoring model for scoring, and acquiring a scoring result of the to-be-reviewed official document output by the preset scoring model; and generating a detected error content according to the format detection result, content detection result and layout detection result, calling out a standard writing rule corresponding to the detected error content, marking the detected error content, the scoring result and the standard writing rule at a preset position in the to-be-reviewed official document, and sending the to-be-reviewed official document that is successfully marked to a preset receiving location according to a storage path designated by the user.

3. The official document processing method of claim 1, wherein calling a format detection rule corresponding to each file component content comprises:
determining a document category of the to-be-reviewed official document according to a title of the to-be-reviewed official document;
if the document category falls into a preset category, calling a format detection rule corresponding to each file component content by using a rule engine; and
if the document category does not fall into the preset category, prompting that the to-be-reviewed official document is not an official document.

4. The official document processing method of claim 1, wherein after performing format analysis on the to-be-reviewed official document, the method further comprises:
if there is no file content in the to-be-reviewed official document, prompting the user to upload the to-be-reviewed official document again and rejecting the current review request.

5. The official document processing method of claim 1, wherein calling a format detection rule corresponding to each file component content, extracting a text format keyword in the file component content, and obtaining a format detection result according to the text format keyword and a format bar in the format detection rule corresponding to the text format keyword comprises:
calling a format detection rule corresponding to each file component content by using a rule engine; one format detection rule contains at least one data type and a format bar in a combination form of each data type;
extracting a text format keyword in the file component content by keyword search technology of the rule engine, and determining whether the text format keyword is consistent with the format bar in the format detection rule corresponding to the text format keyword; one file component content corresponds to at least one text format keyword;
if the text format keyword in the file component content is consistent with the format bar in the format detection rule corresponding to the text format keyword, acquiring the format detection result that file format of the file component content is correct; and
if the text format keyword in the file component content is inconsistent with the format bar in the format detection rule corresponding to the text format keyword, acquiring the format detection result that file format of the file component content is incorrect.

6. The official document processing method of claim 1, wherein after acquiring the to-be-reviewed official document of standard file type, the method further comprises:
when it is detected that there is a table in the to-be-reviewed official document, analyzing the table, and recording each content of the table as the file component content after analysis.

7. The official document processing method of claim 1, wherein dividing coordinate information of the to-be-reviewed official document of standard file type, and performing frame layout detection on the to-be-reviewed official document according to the coordinate information that is divided comprises:
converting the to-be-reviewed official document of standard file type into a preset file type to obtain a to-be-reviewed official document of the preset file type;
inputting the to-be-reviewed official document of the preset file type into a file block division model associated with a text category of the to-be-reviewed official document by using an OCR algorithm engine, receiving a divided text block output by the file block division model, and extracting coordinate information of the divided text block; the coordinate information represents size and location of the divided text block;
performing frame layout detection on the to-be-reviewed official document of standard file type for text format and layout according to the coordinate information.

8. A computer equipment, comprising a memory, a processor, and computer readable instructions stored in the memory and executable on the processor, wherein the processor executes the computer readable instructions to implement following steps:
receiving a review request containing a to-be-reviewed official document sent by a user, performing format analysis on the to-be-reviewed official document and acquiring file type of the to-be-reviewed official document, then acquiring the to-be-reviewed official document of standard file type, and identifying all file component contents in the to-be-reviewed official document of standard file type by a preset BERT model;
performing text format detection, text content detection and frame layout detection synchronously by a preset text processing model constructed based on a distributed framework, obtaining a format detection result, a content detection result and a layout detection result; the text format detection comprises following steps of: calling a format detection rule corresponding to each file component content, extracting a text format keyword in the file component content, and obtaining a format detection result according to the text format keyword and a format bar in the format detection rule corresponding to the text format keyword; the text content detection comprises step of obtaining a content detection result after performing text content detection on the file component content; the frame layout detection comprises following steps of: dividing coordinate information of the to-be-reviewed official document of standard file type, and performing frame layout detection on the to-be-reviewed official document according to the coordinate information that is divided to obtain a layout detection result; and
generating a detected error content according to the format detection result, content detection result and layout detection result, calling out a standard writing rule corresponding to the detected error content, marking the detected error content and the standard writing rule at a preset position in the to-be-reviewed official document, and sending the to-be-reviewed official document that is successfully marked to a preset receiving location according to a storage path designated by the user.

9. The computer equipment of claim 8, wherein the step of generating a detected error content according to the format detection result, content detection result and layout detection result, calling out a standard writing rule corresponding to the detected error content, marking the detected error content and the standard writing rule at a preset position in the to-be-reviewed official document, and sending the to-be-reviewed official document that is successfully marked to a preset receiving location according to a storage path designated by the user comprises:

inputting the format detection result, content detection result and layout detection result into a preset scoring model for scoring, and acquiring a scoring result of the to-be-reviewed official document output by the preset scoring model; and generating a detected error content according to the format detection result, content detection result and layout detection result, calling out a standard writing rule corresponding to the detected error content, marking the detected error content, the scoring result and the standard writing rule at a preset position in the to-be-reviewed official document, and sending the to-be-reviewed official document that is successfully marked to a preset receiving location according to a storage path designated by the user.

10. The computer equipment of claim 8, wherein calling a format detection rule corresponding to each file component content comprises:

determining a document category of the to-be-reviewed official document according to a title of the to-be-reviewed official document;

if the document category falls into a preset category, calling a format detection rule corresponding to each file component content by using a rule engine; and if the document category does not fall into the preset category, prompting that the to-be-reviewed official document is not an official document.

11. The computer equipment of claim 8, wherein calling a format detection rule corresponding to each file component content, extracting a text format keyword in the file component content, and obtaining a format detection result according to the text format keyword and a format bar in the format detection rule corresponding to the text format keyword comprises:

calling a format detection rule corresponding to each file component content by using a rule engine; one format detection rule contains at least one data type and a format bar in a combination form of each data type;

extracting a text format keyword in the file component content by keyword search technology of the rule engine, and determining whether the text format keyword is consistent with the format bar in the format detection rule corresponding to the text format keyword; one file component content corresponds to at least one text format keyword;

if the text format keyword in the file component content is consistent with the format bar in the format detection rule corresponding to the text format keyword, acquiring the format detection result that file format of the file component content is correct; and if the text format keyword in the file component content is inconsistent with the format bar in the format detection rule corresponding to the text format keyword, acquiring the format detection result that file format of the file component content is incorrect.

12. The computer equipment of claim 8, wherein after acquiring the to-be-reviewed official document of standard file type, the processor executes the computer readable instructions to further implement following steps:

when it is detected that there is a table in the to-be-reviewed official document, analyzing the table, and recording each content of the table as the file component content after analysis.

13. The computer equipment of claim 8, wherein dividing coordinate information of the to-be-reviewed official document of standard file type, and performing frame layout detection on the to-be-reviewed official document according to the coordinate information that is divided comprises:

converting the to-be-reviewed official document of standard file type into a preset file type to obtain a to-be-reviewed official document of the preset file type;

inputting the to-be-reviewed official document of the preset file type into a file block division model associated with a text category of the to-be-reviewed official document by using an OCR algorithm engine, receiving a divided text block output by the file block division model, and extracting coordinate information of the divided text block; the coordinate information represents size and location of the divided text block;

performing frame layout detection on the to-be-reviewed official document of standard file type for text format and layout according to the coordinate information.

14. One or more readable storage mediums, storing computer readable instructions, wherein the computer readable instructions, when executed by one or more processors, cause the one or more processors to implement following steps:

receiving a review request containing a to-be-reviewed official document sent by a user, performing format analysis on the to-be-reviewed official document and acquiring file type of the to-be-reviewed official document, then acquiring the to-be-reviewed official document of standard file type, and identifying all file component contents in the to-be-reviewed official document of standard file type by a preset BERT model;

performing text format detection, text content detection and frame layout detection synchronously by a preset text processing model constructed based on a distributed framework, obtaining a format detection result, a content detection result and a layout detection result; the text format detection comprises following steps of: calling a format detection rule corresponding to each file component content, extracting a text format keyword in the file component content, and obtaining a format detection result according to the text format keyword and a format bar in the format detection rule corresponding to the text format keyword; the text content detection comprises step of obtaining a content detection result after performing text content detection on the file component content; the frame layout detection comprises following steps of: dividing coordinate information of the to-be-reviewed official document of standard file type, and performing frame layout detection on the to-be-reviewed official document according to the coordinate information that is divided to obtain a layout detection result; and generating a detected error content according to the format detection result, content detection result and layout detection result, calling out a standard writing rule corresponding to the detected error content, marking the detected error content and the standard writing rule at a preset position in the to-be-reviewed official document, and sending the to-be-reviewed official document that is successfully marked to a preset receiving location according to a storage path designated by the user.

15. The readable storage medium of claim 14, wherein the step of generating a detected error content according to the format detection result, content detection result and layout detection result, calling out a standard writing rule corresponding to the detected error content, marking the detected error content and the standard writing rule at a preset position in the to-be-reviewed official document, and sending the to-be-reviewed official document that is successfully marked to a preset receiving location according to a storage path designated by the user comprises:
    inputting the format detection result, content detection result and layout detection result into a preset scoring model for scoring, and acquiring a scoring result of the to-be-reviewed official document output by the preset scoring model; and
    generating a detected error content according to the format detection result, content detection result and layout detection result, calling out a standard writing rule corresponding to the detected error content, marking the detected error content, the scoring result and the standard writing rule at a preset position in the to-be-reviewed official document, and sending the to-be-reviewed official document that is successfully marked to a preset receiving location according to a storage path designated by the user.

16. The readable storage medium of claim 14, wherein calling a format detection rule corresponding to each file component content comprises:
    determining a document category of the to-be-reviewed official document according to a title of the to-be-reviewed official document;
    if the document category falls into a preset category, calling a format detection rule corresponding to each file component content by using a rule engine; and
    if the document category does not fall into the preset category, prompting that the to-be-reviewed official document is not an official document.

17. The readable storage medium of claim 14, wherein calling a format detection rule corresponding to each file component content, extracting a text format keyword in the file component content, and obtaining a format detection result according to the text format keyword and a format bar in the format detection rule corresponding to the text format keyword comprises:
    calling a format detection rule corresponding to each file component content by using a rule engine; one format detection rule contains at least one data type and a format bar in a combination form of each data type;
    extracting a text format keyword in the file component content by keyword search technology of the rule engine, and determining whether the text format keyword is consistent with the format bar in the format detection rule corresponding to the text format keyword; one file component content corresponds to at least one text format keyword;
    if the text format keyword in the file component content is consistent with the format bar in the format detection rule corresponding to the text format keyword, acquiring the format detection result that file format of the file component content is correct; and
    if the text format keyword in the file component content is inconsistent with the format bar in the format detection rule corresponding to the text format keyword, acquiring the format detection result that file format of the file component content is incorrect.

18. The readable storage medium of claim 14, wherein after acquiring the to-be-reviewed official document of standard file type, the computer readable instructions, when executed by one or more processors, cause the one or more processors to further implement following steps:
    when it is detected that there is a table in the to-be-reviewed official document, analyzing the table, and recording each content of the table as the file component content after analysis.

19. The readable storage medium of claim 14, wherein dividing coordinate information of the to-be-reviewed official document of standard file type, and performing frame layout detection on the to-be-reviewed official document according to the coordinate information that is divided comprises:
    converting the to-be-reviewed official document of standard file type into a preset file type to obtain a to-be-reviewed official document of the preset file type;
    inputting the to-be-reviewed official document of the preset file type into a file block division model associated with a text category of the to-be-reviewed official document by using an OCR algorithm engine, receiving a divided text block output by the file block division model, and extracting coordinate information of the divided text block; the coordinate information represents size and location of the divided text block;
    performing frame layout detection on the to-be-reviewed official document of standard file type for text format and layout according to the coordinate information.

\* \* \* \* \*